United States Patent
Fisher et al.

(10) Patent No.: US 7,428,653 B2
(45) Date of Patent: Sep. 23, 2008

(54) METHOD AND SYSTEM FOR EXECUTION AND LATCHING OF DATA IN ALTERNATE THREADS

(75) Inventors: Duncan M. Fisher, Mission Viejo, CA (US); Keith Bindloss, Irvine, CA (US); Ching Long Su, Arcadia, CA (US); Marty T. Budrovic, Las Flores, CA (US); Rajiv Gupta, Fullerton, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 508 days.

(21) Appl. No.: 11/185,926

(22) Filed: Jul. 20, 2005

(65) Prior Publication Data

US 2006/0020841 A1    Jan. 26, 2006

Related U.S. Application Data

(60) Provisional application No. 60/590,650, filed on Jul. 23, 2004.

(51) Int. Cl.
*G06F 1/12* (2006.01)
*G06F 1/04* (2006.01)

(52) U.S. Cl. ..................... 713/400; 713/600
(58) Field of Classification Search ............... 713/400, 713/500
See application file for complete search history.

(56) References Cited

U.S. PATENT DOCUMENTS 5,694,604 A * 12/1997 Reiffin ................. 718/107
6,061,710 A *  5/2000 Eickemeyer et al. ...... 718/107
7,000,233 B2 *  2/2006 Levitan et al. ........... 718/107

* cited by examiner

*Primary Examiner*—Rehana Perveen
*Assistant Examiner*—Mohammed H Rehman
(74) *Attorney, Agent, or Firm*—Michael A. Rahman

(57) ABSTRACT

An alternate multi-thread pipeline structure and method are provided. A deep pipeline is provided in which two threads of two separate pipeline stages are alternatively presented to the various logic and latch circuits for execution. The execution and latching of the threads alternates from one thread to the other within a single clock cycle. Thus, each thread is executed once per clock cycle and two threads are executed in a single clock cycle.

7 Claims, 4 Drawing Sheets

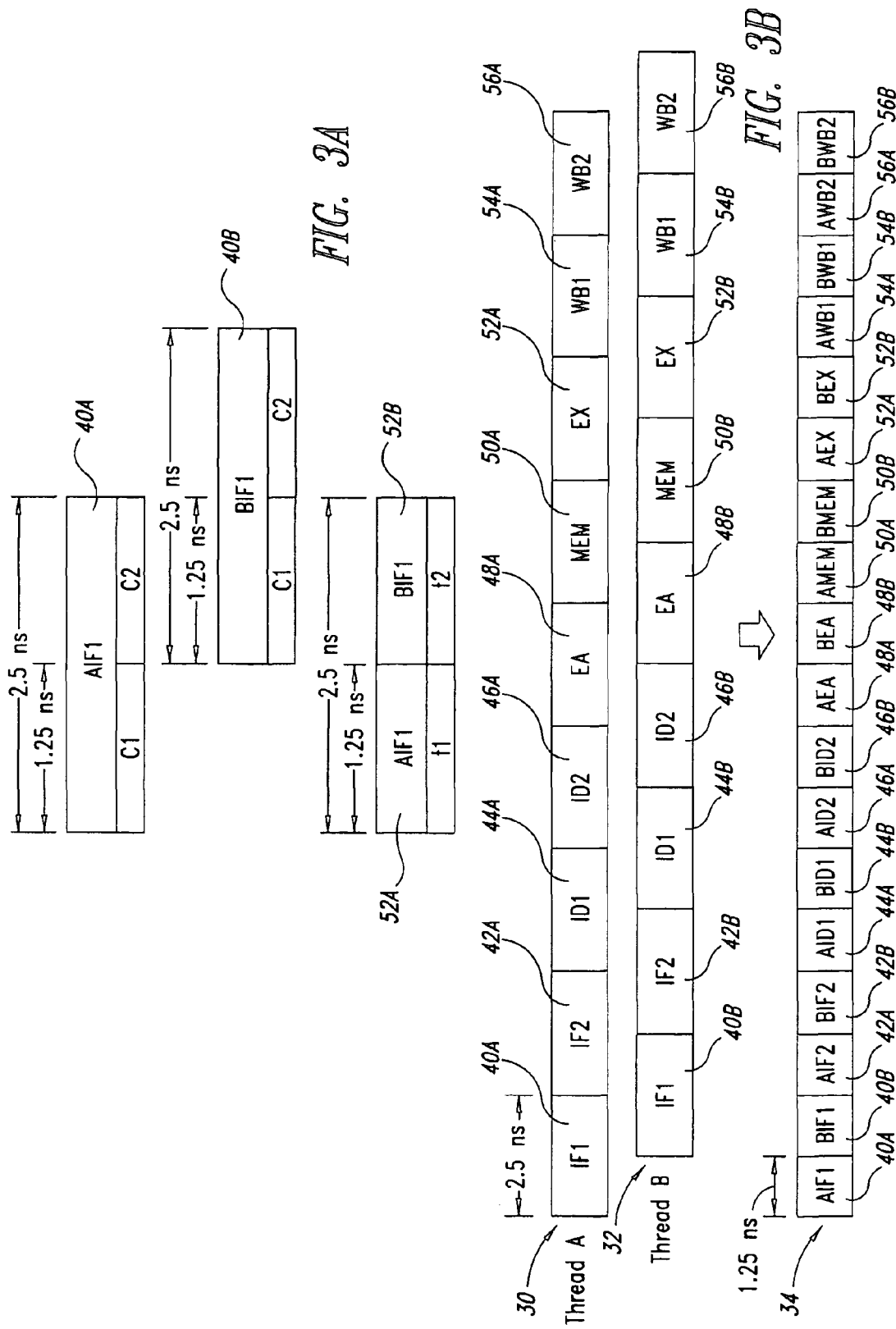

METHOD AND SYSTEM FOR EXECUTION AND LATCHING OF DATA IN ALTERNATE THREADS

BACKGROUND OF THE INVENTION

1. Field of the Invention

This invention relates to a pipe architecture in particular, to alternate multi-threaded pipeline architecture.

2. Description of the Related Art

The pipelining of instructions and data is well known in the processor art for one technique of achieving higher processing speed. In a typical pipelined processor design, the data is passed through the processor in various stages, referred to as a pipeline, in order to process large amounts of data more quickly to obtain a final output at higher speeds.

The processor speed depends on the time to finish each task in every pipeline stage. In order to achieve higher speeds, the pipeline stages are increased in number. For very high speeds, a deep pipeline having as many as 9-12 stages may be used. Such a deep pipeline requires substantial refinement and precise timing between the circuits.

A deep pipeline design usually introduces pipeline stalls and branch penalties. There is a requirement to use static and/or dynamic branch schemes in order to reduce the branch penalties. In addition, multi-threading is sometimes used reduce memory latenancies and VLIW/superscaler to improve ILP (instruction level parallel). The above attempts only solve a few of the problems introduced by using a deep pipeline and the improvement is not significant.

FIGS. 1 and 2A-2C illustrate current attempts at pipeline management. As is known in the art, a pipeline may have many stages. In the embodiments shown, 9 pipeline stages are illustrated, though the use of 6 pipelines stages, or other lengths are well known in the art. The execution of the various pipeline stages of FIG. 1 is illustrated in FIG. 2A.

A pipeline 10 of data is illustrated in FIG. 1. A circuit capable of the pipeline of FIG. 1 includes 9 stages, the first stage being labeled stage 12 and the last being labeled 14. The steps 13 executed in each stage are shown below the name for pipeline stage. One step 13 in the pipeline is executed on one clock cycle. The first step, Instruction Fetch 1, (IF1) is executed on two parts of the clock cycle, C1 and C2. The steps 13 executed on these clock cycles are shown below the pipeline 10, which include I Addr, Program Memory Read, etc.

The execution of the pipeline 10 is described with respect to FIG. 2A. An ALU is one form of a logic circuit 16 which executes the data from the pipeline stages 10. The ALU 16 has clocked inputs 18 and 20, which receive the data and transfer it for execution by the ALU 16 when the clock cycle is enabled.

In the embodiment of FIG. 2A, the clocks C1 and C2 represent opposite phases of the same clock driving the logic circuit 16. On a first clock C1 the data presented at inputs S0 and S1 is provided to the ALU 16 for execution. The execution is completed and the data output of the ALU 16 and presented at the input of multiplexer and drive circuit 22. On the opposite phase, the data is clocked out of the multiplexer 22 for presentation 23. It is also fed back for presentation to the ALU 16 on the subsequent clock cycle C1.

In the embodiment of the prior art in FIG. 2A, a single thread of pipeline data is being processed. The time of a single clock cycle is 2.5 nanoseconds, shown in FIG. 2A. The first part of the cycle introduces the data to the ALU for execution, while the second part of the operates on the same thread and the same data to provide an output to execute the data. The same pipeline thread 10 continues through the ALU 16 for execution one stage at a time.

The operation of steps 13 can be seen in FIG. 1, after the first step of IF1, a program memory read is executed which requires two clock cycles followed by subsequent execution on each clock cycle, such as instruction drive, IR latch and pre-decode ARF address, ARF read, etc. This particular approach makes use of a highly pipelined processor in order to obtain an output stream.

Traditionally, a pipeline architecture is carried out as shown in FIG. 2B in which each processor is physically separate from each other. Processor 25 and 27 are on a physically separate processor. Each of the processors operates in parallel using one or more state machines in order to track the data.

There is a potential that the different instructions or data may cause delays in execution, and thus dedicated processors, each with its own state machine, are often used to avoid errors. This traditional dual processor system results in time delays and large use of surface area. Achieving fast clocks beats becomes more difficult. One prior art technique is described in an article in *Microprocessor Report*, Volume 16, Archive 2, Feb. 2002, pages 4-9 titled "Technology 2001: On a Clear Day You Can See Forever," by Max Barron, which illustrates an improvement in which the processor core remains the same and two execution logic circuits 15 are used which share processor core resources. While this results in some improvement in operational time, it fails to provide a substantial advance across the entire system level.

BRIEF SUMMARY OF THE INVENTION

According to principles of the present invention, an alternate multi-thread pipeline structure and method are provided. A deep pipeline is provided in which two threads of two separate pipeline stages are alternatively presented to the various logic and latch circuits for execution. The execution and latching of the threads alternates from one thread to the other within a single clock cycle. Thus, each thread is executed once per clock cycle and two threads are executed in a single clock cycle.

An apparatus for carrying out the present invention includes a logic circuit having a first input and a second input. First and second clocked input circuits are provided having their respective outputs coupled to the input of the logic circuit. A signal line of a first thread is coupled to both of the first and second input circuits. A second thread signal line of a second thread is also coupled to the first and second input circuits respectively. On a first clock event the signal from the first thread for both the first and second input circuit 20 is input to the logic circuit for execution. On a second event of the same clock, clock the data present on the second thread is clocked by the first and second input circuits into the logic circuit for execution. Also on the second clock event, the executed data from the first thread that has been output by the logic circuit is latched by a driver circuit into an output node which also acts as a feedback node. A feedback connection is provided from the output node to the first input circuit for feedback of the output. The timing is selected to ensure that the feedback from the first thread is presented for execution simultaneously with other steps from the same first thread. Execution of data from the second thread is timed to ensure that it does not interfere with data from the first thread.

The two threads are executed simultaneously on the same hardware however the clock events are timed to ensure that the two threads maintain the same latency between pipeline stages as previously present in one thread. There is a switch from one thread to the other thread at each clock event there being two clock events per cycle.

If there is a stall in one thread, the data is shifted into a shadow register and the other thread continues to move through the pipeline. Thus, a stall in the execution does not affect or slow down one the unaffected thread.

Preferably the clock cycle is doubled in speed beyond that which is required for the data of a single thread to be processed. The two clocks operate at double the frequency, with the rising edge of the first clock advancing each thread data one stage further into the pipeline and the rising edge of the second clock completing the execution of that stage of the pipeline so the thread is ready to advance to the next stage. Since the clock speed is doubled from what is needed to complete the execution, a new data enters the pipeline at twice the prior rate. The second clock provide sufficient time for the data to be executed in the stage of the pipeline. Thus, the time within each stage of the pipeline remains the same and a doubling of data through put is obtained with the same hardware.

According to a alternative embodiment, one clock event in a single clock cycle is the rising edge of the clock pulse and the other clock event in the clock cycle is the falling edge of the clock pulse. Accordingly, one thread is latched for execution on the rising edge of each clock pulse and it is also moves from stage to stage on the same rising edge through an operation of the pipeline system. The other thread is latched and execution is started on the falling edge of the same clock pulse.

The present invention provides an architecture that allows very high speed processor design with an effective deep pipeline and high scalability. The, the pipeline can easily operate in the gigahertz plus range without introducing new pipeline stalls or branch penalties. Further, complex circuit design is avoided. The alternate multi-thread architectures solves the branch and latency problems of the prior art by doubling or otherwise multiplying the pipeline stages and switching threads in a pre-defined order. Another substantial advantage to the present invention is that the same software for executing the code can be used. The same instruction set and register structure as presently in the microprocessor may still be used. The substantial increase in performances achieved with only slight increases in the power consumption and the use of a few additional logic and latch circuits. Two tasks are thus able to run simultaneously, achieving substantial benefits.

BRIEF DESCRIPTION OF THE DRAWINGS

FIGS. 3A and 3B illustrate two threads being executed in an alternate threaded pipeline according to principles of the present invention.

DETAILED DESCRIPTION OF THE INVENTION

Figure 1:
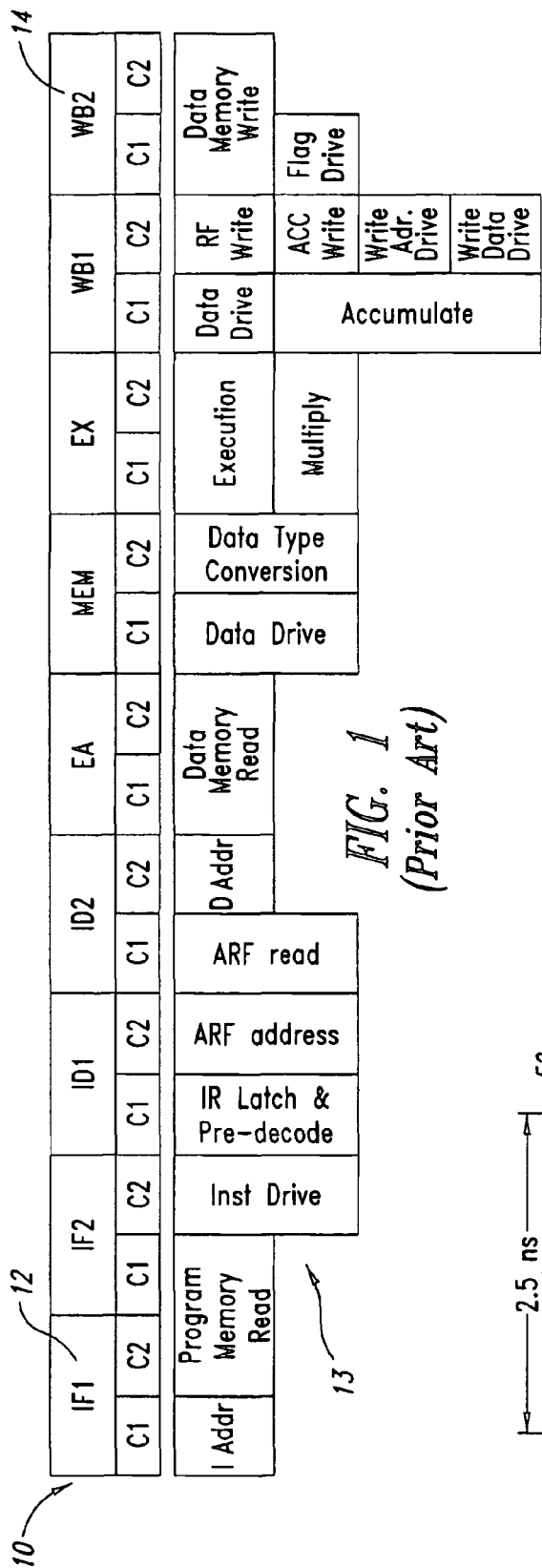
FIG. 1 illustrates a block diagram of a pipeline according to the prior art.

As shown in FIG. 3B, Thread A 30, standing alone is organized as known in the prior art, while Thread B 32, standing alone is also organized as known in the prior art. The combining of the two creates in an alternative threaded pipeline 34 within the present invention. FIG. 3A shows how the two stages are timed of the different threads.

FIG. 3A illustrates two data stages being executed in an alternate multi-thread pipeline according to principles of the present invention. The first data set, 40A is part of a first thread 30 and a second data set, 40B is part of a second thread, 32. Each data set will start execution on the rising edge of clock 1 and is presented to the ALU for execution. The clock rate of C1 is double the clock rate for the hardware to complete execution of the data. The hardware on which the threads 30 and 32 will be executed is similar to the hardware of FIG. 2A, with minor changes described later herein. The input to the ALU is shifted by half a clock cycle for thread 30 and thread 32. As shown in FIG. 3A, on clock C1, the first thread 30 is introduced to the execution stage; while it is being executed, the second thread 32 is introduced to start execution. While the first data set is being executed within the ALU, the clock C1 for the second thread rises, starting execution of the second thread, 32.

As shown in FIGS. 3A and 3B, the present invention provides for a first thread 30, labeled Thread A and a second thread 32 labeled Thread B to be alternatively executed within the same logic unit. The instructions are threaded inbetween each other with the feedback path connected to ensure that the feedback from the first thread affects only data from the first thread and feedback from the second thread affects only data from the second thread.

The execution of the alternate threaded data stream can be seen as pipeline 34, which shows the threads intertwined. An instruction from Thread A is alternatively executed with every other instruction from Thread B on subsequent clock events. In a preferred embodiment, one instruction from each thread is executed per clock cycle so that two instructions are executed per clock cycle. This results in doubling the execution speed of the data path for a given clock cycle. Thus, if the execution of the data were previously at 300 MHz by doing the alternating multi-thread architecture of the present invention, the execution is at 600 MHz. In one embodiment, the clock speeds are doubled so that execution of each thread alone is carried out at the same speed as before, but since the threads are alternated with each other and each runs at the same speed as one thread alone, both threads are executed at the same rate as one thread of the prior art, thus effectively doubling the execution of the data.

The first clock event is the rising edge of C1 that triggers the execution of a step in Thread A. The rising edge of C1 again, which is now at double the speed, triggers the execution of the next step or instruction from Thread B. The rising edge of the next clock pulse, C2, triggers the execution of the next data or instruction from Thread A.

Within the present invention, the content of Thread A will be referred to as either an instruction, or sometimes as data. The performing of some function with the data is referred to as the execution of the data. The phrases "instruction" and "data" are to be interpreted broadly so as to include any informational signal traveling through a path. For example, in some cases, the data may be an instruction, and thus be executed by performing the instruction in a core logic circuit. Also, in some cases, the instruction, may in fact be a type of data. The data may be an address or, alternatively a value parameter, whether numeric, alphabetic, or some other value.

Thus, the term "data" is intended to be used in its broadest sense to include all types of data signals which may be stored, executed, or used as pointers, addresses or for other purposes in the digital signal processor. The two terms may be used interchangeable for certain operations and stages in the context of the present invention.

The execution of the data refers to the data being treated in its intended manner by the logic circuit to which it is input. In the example provided in FIG. 4, the logic circuit is an arithmetic logic unit, may be a multiplier, an adder, a digital signal processor or some other logic unit. Thus, the execution in the logic unit refers to the treatment of the input data according to the rules of the particular logic circuit to which it has been input. The use of the ALU is provided as one acceptable example but other types of logic circuit 16 may be used and are considered equivalent to that of the ALU shown with respect to the present invention.

As shown in FIG. 3B, Thread A 30, standing alone is organized as known in the prior art, while Thread B 32, standing alone is also organized as known in the prior art. The combining of the two creates in an alternative threaded pipeline 34 within the present invention.

Figure 4:
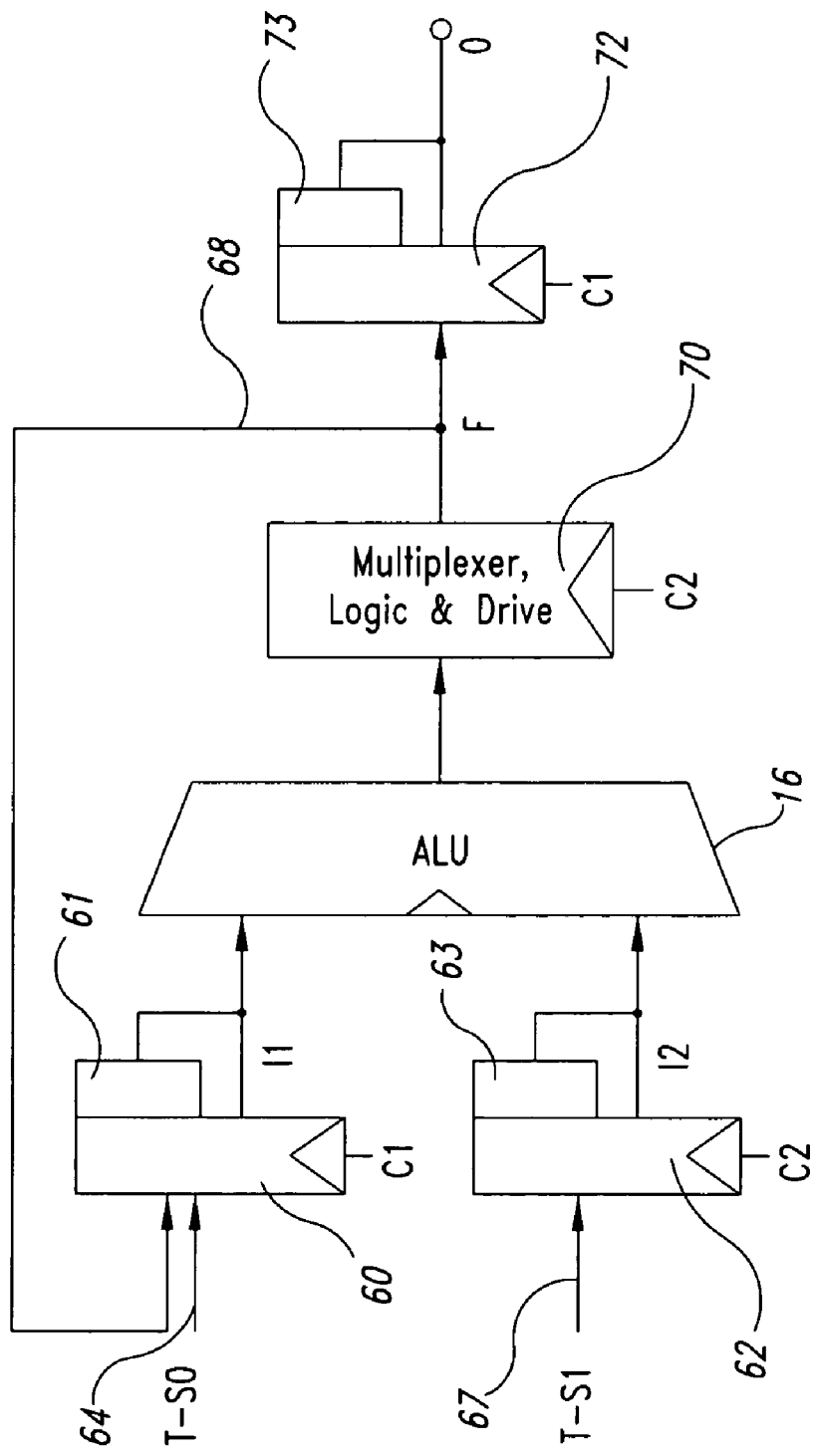
FIG. 4 illustrates a structure for carrying out the alternate threaded pipeline according to principles of the present invention.

Considering both the schematic block of FIG. 4 and the threads of FIG. 3B, on a single clock cycle two instructions are executed, a first instruction from Thread A and a second instruction from Thread B. On a subsequent clock cycle two more instructions are executed, one from each of Thread A and Thread B, alternating with each other. The execution of the alternative threads of the pipeline continues as shown in FIG. 3. The pipeline 34 with eighteen stages of data being executed in the same time which previously executed nine stages of pipeline.

The execution of the stages in the alternate threaded pipeline 34 uses basically the same hardware and the same software as previously existing, with some changes to take advantage of the time multiplexing and multi-threading. Within Thread A or B, the examples of the data being executed may include such items as data 40, IF1, instruction fetch cycle 1; data 42, IF2, instruction fetch cycle 2; data 44, ID1, instruction decode cycle 1; data 46, ID2, instruction decode cycle 2; the fifth data 48, EA being effective address calculation. The data MEM 50, being the sixth data, MEM, memory access. The seventh data 52 being EX, execution cycle 1. The eighth data, WB1 being write back cycle number 1; and the ninth data 56 being write back number 2. The letter A being present behind each reference number in FIG. 3 indicates that the stage is part of Thread A, while a B, behind the number that they are in Thread B. Thus, Thread A is composed of standard data instruction sets 40A, 42A, 44A, 46A, 48A, 50A, 52A, 54A and 56A as would exist in a conventional well-known pipeline.

Figure 2C:
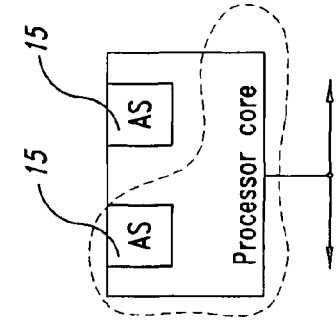
FIGS. 2B and 2C illustrate various processor organizations for threaded pipeline execution according to the prior art.
Figure 2B:
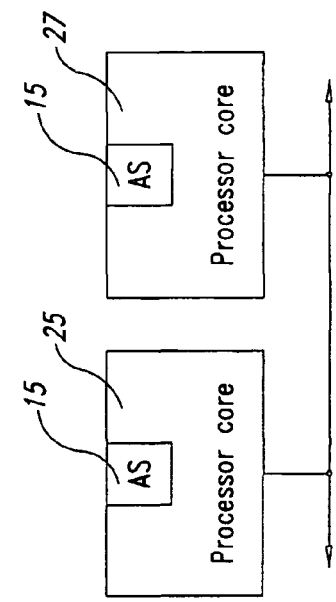
Figure 2A:
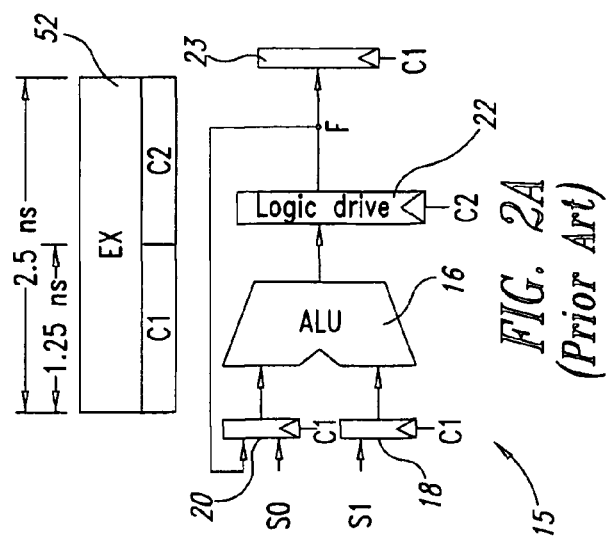
FIG. 2A illustrates a structure for executing the pipeline at FIG. 1 according to the prior art.

According to the prior art, as previously discussed with respect to FIG. 1 and FIG. 2A, each of these data and/or instructions are executed on a single clock cycle, a first clock being used for the first part of the execution of the data and the second clock being used for the latching and/or the second execution of the data. Thus, shown in FIG. 2A, of the prior art, one entire clock cycle is required to perform the execution cycle 1 from the pipeline of the prior art. Two clock events, C1 and C2, constituting a full clock cycle are used to complete the execution of instruction 52. A single clock cycle lasting 2.5 nanoseconds and half of the clock cycle being 1.25 nanoseconds as shown in FIG. 2A.

According to the present invention, during the same time period of the single clock cycle, two instructions are executed, one in each clock event, there being two clock events per clock cycle. Thus, on the first event of the clock cycle, in one example the rising pulse of C1, the Instruction Fetch cycle 1 from Thread A, 40A is introduced to the logic unit 16 for execution. On a subsequent clock event, such as the next rising edge of the same clock cycle, the next instruction is from Thread B, in this example Instruction Fetch Cycle 1, 40B is introduced for execution in the arithmetic logic unit 16. The data and the instructions sets from Threads A and B are alternatingly executed on each clock event giving the effective results of an eighteen stage pipeline from a nine stage thread.

FIG. 4 illustrates the circuit for carrying out the present invention. The logic as used in the prior art is modified slightly in order to carry out the alternating multi-thread pipeline of threads A and B. A logic circuit 16 is provided for execution of the input data S0 and S1, as in the prior art, but with a significant difference in the threads, as will now be explained. A first input circuit 60 is coupled to the logic circuit 16 to carry input signal S0 on line 64. A second input circuit 62 is provided to carry input signal S1 on line 67. A shadow register 61 is coupled to the input circuit 60, while a shadow register 63 is coupled to input circuit 62. The shadow registers 61 and 63 provide important advantages for moving the threads through the pipeline when there is a stall, a feature not possible in the prior art. Each of the input circuits 60 and 62 receives a clock event via clocks signals. Presented to input circuit 60 is a signal line 64 that will carry each of the threads to be alternatively clocked into the logic circuit. A first signal line 64 provides an input for Thread A during a first time period. In a preferred embodiment, the same line 64 has presented to it an input for Thread B on a next clock event. Thus, both Thread A and Thread B are provided at the input to the input circuit 60 on line 64, time multiplexed. The threads are clocked into the input circuit 16 for execution in the logic element, in this example, for execution in an ALU. In an alternative embodiment, a second input line to circuits 60 and 62 is provided and the time multiplexing of the input lines to the input circuits need not be carried out.

The second input circuit 62 has an input line 67 that has input provided to it. The input line 67 has time multiplexed onto it the data from S1 that will be acted on in logic circuit 16 with the input from S0 that has alternatively Thread A and Thread B, as described with respect to line 64.

Input circuits and their 60 and 62 will be described herein in more detail. On the first clock event, the input circuits 60 and 62 are clocked so that the data signal at the input is provided at the output. For example, the data on thread A is latched at the ALU source. On the next clock event, Thread A is executed in the ALU 16 and Thread B is latched at the ALU source. On the next clock event, Thread B is executed and Thread A is latched at the ALU source. This repeats and continues, with the simultaneous execution and latching of respective threads A and B, so that Alternate Multi-Thread operation is achieved. As can be seen, the appropriate thread, whether Thread A or Thread B, is output from the clocked input circuits depending on the portion of the cycle. The proper selection of one of the threads can be achieved by any number of acceptable methods. For example, the clock input circuits 60 and 62 in one a embodiment are a multiplexed input circuits. In a multiplexed version of circuit 60 a time multiplexed signal line is provided, which presents the appropriate Thread, Thread A or B to be latched and passed through to the output, such circuits per se being well known. In another embodiment the input circuit 60 is sensitive to the type of clock signal being presented for the transferring of data from the input to the output. On a rising pulse, the clock circuit 60 is structured to provide at its output the signal of Thread A and to block from being output the data at the terminal for Thread B. Similarly, on rising edge of the next clock signal, C2, the clock circuit is structured to output the signal present on signal line for Thread B at its output and block the output of signal line from Thread A. Further, in each of the clock cycles, the information on the feedback loop 68, if present, is also clocked into the logic circuit 16.

The logic circuit 16 is an automatic execution circuit which is not clocked in the present embodiment, but which takes a selected time to complete the execution. Namely, as soon as data is presented at the inputs, the data is executed and provided at the output based on the speed that the hardware can execute the data. The arithmetic logic unit 16 is therefore able to operate at a high rate of speed which is selected to be more rapid than one-half of a clock cycle. After the first clock event has occurred, the data will be executed inside the logic unit 16 and the output provided at the input to multiplexing driver circuit 70. On the subsequent clock event, such as the rising (or in some cases, the falling) edge of the clock pulse which is present at the input of multiplex and drive circuits 70 will be driven through to the output from node F. Thus, the present invention takes advantage of the fact that unclocked logic units are able to process data or execute instructions to be provided for an input to the next cycle during the transition between subsequent clock events, such as the rising edge and falling edge of a clock cycle. Thus, the arithmetic logic unit is able to execute the data and have the output present prior to the second half of the clock cycle occurring so that the output from Thread A has been processed and circuit is ready to receive new data from Thread B at its input during the second half of the same clock cycle.

Many times, a thread will stall in execution during the pipeline. Pipeline stalls are frequent in the prior art and occur on events that are difficult to predict. For example, the data needed for the next step in the thread may not be ready from another part of the circuit, or an execute from another part of the hardware is not completed slightly slower than standard so its output is not present for a given thread to proceed. When a pipeline stall occurs, the thread stops. This was common in the prior art and the entire pipeline must stop until the stall clears. The present invention is effective to avoid overcome the problems caused by pipeline stalls. If a stall occurs in one thread, the thread is shifted into shadow register 61 and 63. For example, if there is a stall in pipeline A, then the data in the next step of pipeline A is moved into the shadow register of the respective clock, whether 61, or 73. Thread B is executed on the next clock cycle and continues to move through the pipeline stages. Thread B can continue to move without concern for the stall in pipeline A. Thus, many cycles of Thread B may execute with circuit waits for the stall in pipeline A to clear. When the stall clears, then on the next clock cycle, Thread A is moved from the respective shadow registers back into the pipeline stages for execution alternating with Thread B. The stopping of a single thread during a pipeline stall and the holding and restating of a thread are well known in the art, so the details are not shown. Those of skill in the art of very familiar with such stalls and the circuit connects and timing to handle them until they stall is cleared, and the same techniques as used in the prior art to handle a stall and a restart of one thread can be used for either thread A or B of the present invention.

The important advantage of the present invention is that a stall in one thread does not slow the execution of entire system and stop all threads that are moving in the system. The other thread which is being executed on the same hardware can continue. Thus, instead of a pause in all data execution for one or several clock cycles during a stall, during which the ALU and other hardware is idle, the other thread continues to move through the pipeline. Data is executed at the standard rate. Once the stall is cleared, both threads are once again executed in an alternating fashion as before, providing double the execution of data. A multiplex and drive circuit 70 is coupled to the output of the logic circuit 16. This circuit provides and holds the data in a feedback node F. The multiplexer will select for feedback the appropriate thread, A or B, depending on which thread is being presented to the clock circuits 60 and 62 so that the two threads do not intermix and remain completely independent of each other, even though they are using the same ALU and clocking circuits. A feedback line 68 is coupled from the feedback node F to the input of clock input circuit 60 so that executed data may be provided back to the logic circuit in the correct thread sequence for the next subsequent data or instruction within the same thread. Specifically, the selection of the clock cycles and the location of the feedback loop 68 is selected to ensure that data instructions from Thread A are ensured of being fed back to only Thread A, and that data instructions from Thread B are ensured of being fed back only to Thread B.

If the logic circuit 16 is an adder frequently one or more carry bits will be required to be fed back to the input. Similarly, DSP circuits have carry bits or instruction flags whose output is determined by the execution which occurs within the logic circuit 16. Provision is made for these to be fed back on feedback path 68 or fed to other circuits if such are present. Of course, some logic circuits will not require a portion of the data and the instruction to be fed back, in which event the line 68 will be a null data set and will not appear as the feedback signal and therefore its contribution at input circuit 60 will have no effect on execution within the logic circuit 16.

Figure 5:
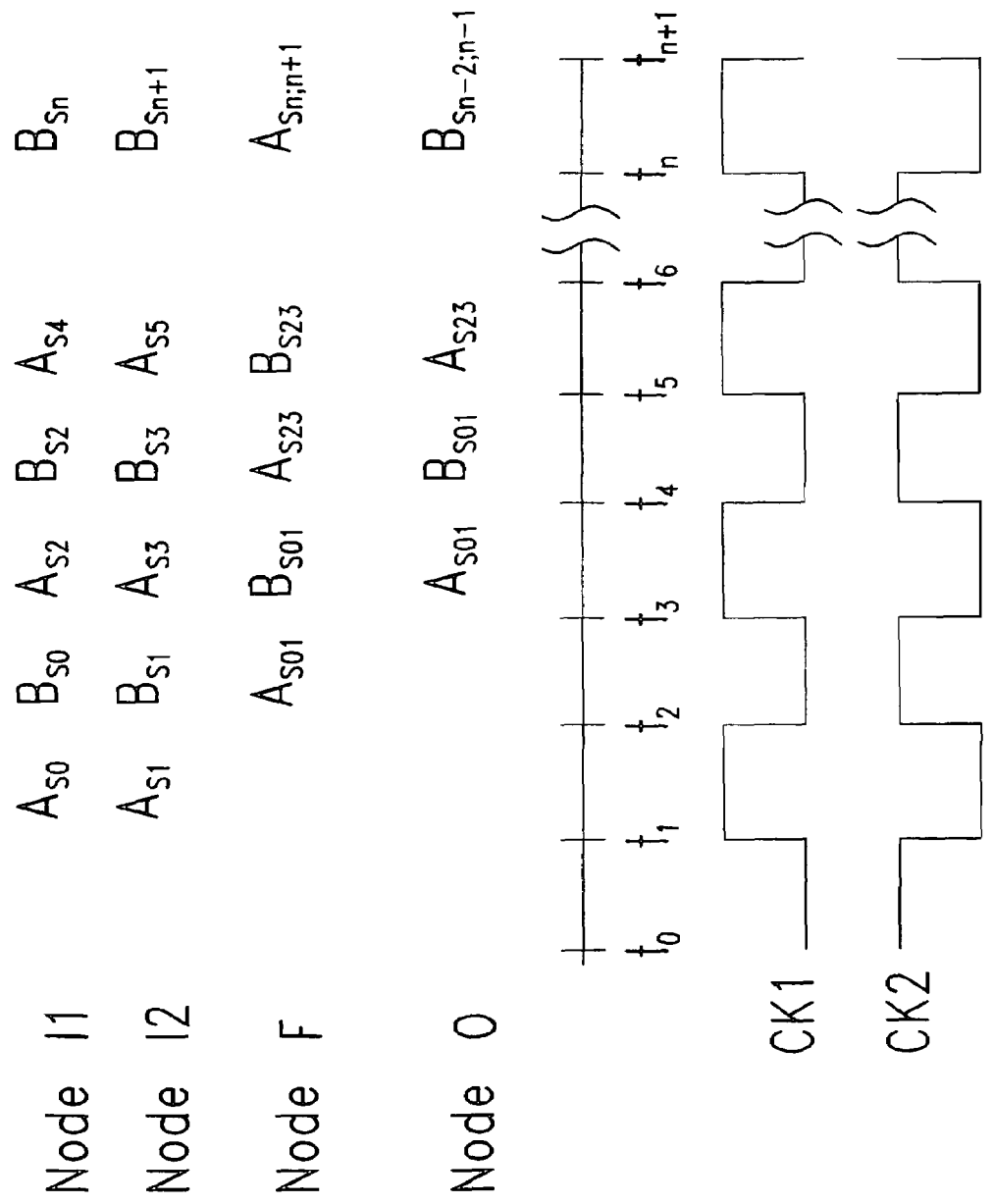
FIG. 5 illustrates a timing diagram and a signal execution for various nodes in the circuit of FIG. 4.

The method by which data is transitioned through the circuit of FIG. 4 is shown in FIG. 5 to represent the data present at the various nodes as marked in FIG. 4. Nodes 11 and 12 represent the input nodes to the logic circuit 16. These nodes are the transition nodes which are the output of the first and second input circuits 60 and 62 and are provided as the direct inputs to the logic circuit 16. Thus, data present at nodes 11 and 12 will be executed immediately without further clocking.

The feedback node F between the multiplex and driver circuit 70 and the clock output driver 72. It may also be considered an output node since the data is the same at the output node and an output driver circuit 72 is provided which provides the driven output data which may or may not be inverted from the feedback node F. The output node 0 represents the final combined output data. The clock pulse may be considered to having various clock events occurring begin at time to a first event is at time $t_1$, second event at time $t_2$, and third event at time $t_3$ and so forth. In one embodiment, each of the clock events is represented by a transition in the edge of the clock pulse. For example, time event $t_1$ is the rising edge of the clock pulse and event $t_2$ is the falling edge of same clock pulse and the rising edge of the other clock, C2. Other clock events could also be considered the equivalent and substituted in place of the rising and falling edges of the clock pulses. At time $t_1$ the description of the operation of the data as shown in FIG. 5 as operating in the circuit of FIG. 4 will now be described in detail with respect to the timing diagram. At a first clock event $t_1$ the Thread A data is latched into the logic circuit 16 as an input. This means that the data which is present on signal line Thread A at the input to the clock circuit 6 and 62 is transitioned to nodes 11 and 12 as indicated in FIG. 5. Thread A signals S0 and S01 are therefore present at the input node of logic circuit 16. The latched data enters the input nodes $t_1$ and $t_2$ on the rising edge of the clock pulse at event $t_1$ and remained present during the period between $t_1$ and $t_2$. While they are present at the input node, the logic circuit 16 executes the data and provides it at its output. The data on Thread B is present at this time on the inputs of 60 and 62 and is ready for the next latch cycle. At time $t_2$ on the falling edge of the same clock pulse, the data is being executed in the ALU and moved forward. Keep in mind that clocks C1 and C2 are now at double the prior frequency. As the clock C1 rises again, $t_3$ Thread B data is latched into the logic circuit 16 source. Simultaneously, Thread A data which has been executed, which has just completed execution in the ALU is latched by the multiplexing drive circuit 70 to the feedback node F. Thus, as can be seen in FIG. 5, the executed instruction, represented by the symbol $A_{S01}$ enters node F shortly after time $t_2$ being triggered on the clock event $t_2$. With the latch data present feedback node F, and provided to the feedback input terminal to the input circuit 60. Thus, if executed data is of the type for which a feedback signal is required, such feedback signal will be provided on feedback line 68. It will therefore be available and waiting at the input of clock circuit 60 while the second set of instructions in each of Threads A and B are provided to the input nodes of clock circuit 60 and 62. The next data and/or instruction set of Thread A is presented to the input of clocks 60 and 62, together with any feedback on line 68. On the next clock event, which is the rising edge of the subsequent clock pulse time $t_5$ the data of Thread A is latched into the logic circuit 16 source for execution. The prior data set of Thread B has just completed execution inside the logic circuit and is latched out to node F as indicated in FIG. 5. Further, the final data from the first Thread A is latched out of the output driver circuit 72 and is provided output node 0. On the subsequent clock cycles, the pattern repeats with Thread B and Thread A, the subsequent data signals being latched forward into their respective nodes at each clock transition point. Thus, new data is provided at each clock transition point on the output node. The data is provided at the rate of two executed data bits compared to the prior art clock cycle rather than one executed data thread per cycle. Thus, the data is output at double the prior rate and the effective computation power of the logic circuit has been doubled while keeping the power consumption approximately the same. The pipeline depth has been effectively doubled while maintaining the same pipeline branch rules and architecture. The present invention thus provides little to know software impact on the overall system. The same assembler and link of codes can be used. The same DSP codes for voice and modem as well as the CODEC can also be used. Some minor changes are required in the task arrangement to ensure that the tasks are being executed simultaneously are properly organized. However, the protocol stack remains the same.

The present invention provides the substantial advantages over the prior art. The present multi-threaded scheme using two threads is able to achieve twice the execution speeds using substantially the same hardware and exactly the same software. A deep pipeline is achieved without pipeline penalties. Namely, an effective 18 stage pipeline is available using only 9 stages of pipeline for each thread. A substantial advantage is that the software remains unchanged for substantial portions of the circuit. The same instruction said and register structure can be used as in the standard microprocessor. The same pipeline stall and pipeline branch rules are applied from the standard pipeline architecture. The same optimization code can be used. Thus, substantial software changes will not be required. Instead, two threads or what may be considered two channels or run simultaneously thus providing twice the performance. Some slight modifications to the clock input register 16 and 62 as well as to other portions of the circuit, such as the feedback circuit 72 are all that is necessary in order to achieve the alternative multi-threading of the present invention, such as the multiplexer and shadow registers of FIG. 4. Adding the additional circuits at numerous places in the chip results in the slight increase in overall chip size, for example 20 and 30 percent minimum geometries. Much of the control logic can be resused. Some latches will be added or modified, as well as circuit optimization. A substantial advantage is that the increase in power consumption is slight. It is estimated that the power consumption will be approximately 20%-30% greater than that used in the standard threaded or hyper thread architecture. The twice the instruction execution rate is achieved with only a modest increase in core power consumption. The increase in power consumption is based on the additional control logic and latches of which only modest increases are needed in order to achieve the double throughput based on principles of the present invention. A substantial advantage is obtained in SPU performance. Two tasks can run simultaneously. The alternative threaded architecture thus substantially speeding up overall circuit performance well beyond what would otherwise be permitted.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of pipelining data comprising:
    inputting to a logic circuit a first data set of a first thread on a rising edge of a first clock pulse;
    inputting to the logic circuit a first data set of a second thread on a falling edge of the first clock pulse;
    executing in the logic circuit the first data set of the first thread during the time between the rising and falling edges of the first clock pulse;
    moving the executed first data set signal of the first thread to a feedback node on the falling edge of the first clock pulse;
    inputting to the logic circuit a second data set from the first thread, together with the feed back data from the first data set signal of the first thread on a rising edge of the second, subsequent clock pulse;
    executing in the logic circuit the first data set of the second thread during the time between the falling and rising edges of the first and second clock pulses;
    moving the executed first data set signal of the second thread to a feedback node on the rising edge of the second clock pulse; and
    inputting to the logic circuit a second data set from the second thread, together with the feed back data from the first data set signal of the second thread on a falling edge of the second, subsequent clock pulse;
    outputting a completed first data set of the first thread to an output node on the rising edge of the second clock pulse.

2. The method according to claim 1 wherein the execution of data sets from the first and second threads alternates on the respective rising and falling edges of clock pulses.

3. The method according to claim 1 wherein the any feed back data from first thread is presented to be input with only with subsequent data from the first thread and any feed back data from the second thread is presented to be input only with subsequent data from the second thread.

4. The method according to claim 1, wherein the logic circuit includes a first and a second input, the first input of the logic circuit being coupled to an output of a first input circuit, the second input of the logic circuit being coupled to an output of a second input circuit.

5. The method according to claim 4, wherein a first thread signal line is coupled to the first input circuit for being selectively input to the logic circuit.

6. The method according to claim 4, wherein a second thread signal line is coupled to the second input circuit for being selectively input to the logic circuit.

7. The method according to claim 4, wherein a control circuit is coupled to the first and second input circuits for alternatively passing a first thread signal or a second thread signal through the first and second input circuits to the logic circuit for signals from first thread to be executed by the logic signal simultaneously with each other and upon a subsequent clock event, signals from the second thread to be executed by the logic circuit simultaneously with each other.

* * * * *